US012037973B1

(12) United States Patent
Allan

(10) Patent No.: US 12,037,973 B1
(45) Date of Patent: Jul. 16, 2024

(54) HYDROELECTRIC SYSTEM FOR PRODUCTION OF ELECTRICITY IN OPEN WATER

(71) Applicant: Christopher James Allan, Mission Viejo, CA (US)

(72) Inventor: Christopher James Allan, Mission Viejo, CA (US)

( * ) Notice: Subject to any disclaimer, the term of this patent is extended or adjusted under 35 U.S.C. 154(b) by 0 days.

(21) Appl. No.: 18/305,449

(22) Filed: Apr. 24, 2023

(51) Int. Cl.
*F03B 17/06* (2006.01)

(52) U.S. Cl.
CPC .................................... *F03B 17/06* (2013.01)

(58) Field of Classification Search
CPC ........................................................ F03B 17/06
See application file for complete search history.

(56) References Cited

U.S. PATENT DOCUMENTS

2020/0056578 A1 * 2/2020 Sheldon-Coulson ........................ F03B 13/145

* cited by examiner

*Primary Examiner* — Viet P Nguyen
(74) *Attorney, Agent, or Firm* — Vladimir Postnikov

(57) ABSTRACT

A hydroelectric power generation system that utilizes the principles of fluid displacement, fluid dynamics, and electromagnetic induction heating is provided. The system comprises a retaining reservoir, an intake reservoir, a drive housing, a drive comprising an internal hydraulic turbine and an internal hydroelectric generator, an exit channel having an induction coil, a support structure, an external hydraulic turbine, and an external hydroelectric generator.

18 Claims, 7 Drawing Sheets

HYDROELECTRIC SYSTEM FOR PRODUCTION OF ELECTRICITY IN OPEN WATER

BACKGROUND OF THE INVENTION

Technical Field

The present invention relates to hydroelectric power generation and, more particularly, to a hydroelectric power generation system for use in open water utilizing the principles of displacement, fluid dynamics, and electromagnetic induction heating.

Background of the Art

Hydroelectric power generation is one of many ways in which electricity can be generated. In 2009, the three most heavily used sources for generating electricity were coal, natural gas, and oil. These sources not only release emissions that are harmful to the environment, but they are also resources that are quickly running out. Therefore, different ways of generating power need to be explored. Hydroelectric power works to harvest the inherent energy of moving water by directing the water through a turbine in order to convert the energy of the moving water into mechanical energy. The mechanical energy is then converted into electricity in the generator. In order to choose the appropriate generator for a specific application, the flow rate and pressure head of the water source must be known.

Hydroelectric power generation on a small scale is one of the most cost-effective energy technologies for rural electrification in less developed countries. It is also the main prospect for future hydro developments in Europe, where large-scale opportunities have either been already exploited or would now be considered environmentally unacceptable. Small hydroelectric power generation technology is extremely robust and is also one of the most environmentally benign energy technologies available.

The development of hydroelectric technology in the 20th century was usually associated with the building of large dams. Hundreds of massive barriers of concrete, rock, and earth were placed across river valleys worldwide to create huge artificial lakes. While they created a major reliable power supply, as well as provided irrigation and flood control, the dams necessarily flooded large areas of fertile land and displaced thousands of local inhabitants. In many cases, the rapid silting up of the dam has reduced its productivity and longevity. There are also numerous environmental problems that can result from such major interference with river flows.

Hydroelectric power, also called hydroelectric energy or hydroelectricity, is a form of energy that harnesses the power of water in motion—such as water flowing over a waterfall—to generate electricity from a renewable resource. Hydropower provides about 96 percent of the renewable energy in the United States. Other renewable resources include geothermal, wave power, tidal power, wind power, and solar power. Hydroelectric power plants do not use up resources to create electricity nor do they pollute the air, land, or water, as other power plants may. Hydroelectric power has played an important part in the development of this Nation's electric power industry. Both small and large hydroelectric power developments were instrumental in the early expansion of the electric power industry.

Hydroelectric power comes from flowing water in winter and spring runoff from mountain streams and clear lakes. Water, when it is falling by the force of gravity, can be used to turn turbines and generators that produce electricity. Hydroelectric power is important to our Nation. Growing populations and modern technologies require vast amounts of electricity for creating, building, and expanding.

In the 1920s, hydroelectric plants supplied as much as 40 percent of the electric energy produced. Although the amount of energy produced by this means has steadily increased, the amount produced by other types of power plants has increased at a faster rate. Currently, hydroelectric power presently supplies only approximately 10 percent of the electrical generating capacity of the United States. Hydropower is an essential contributor to the national power grid because of its ability to respond quickly to rapidly varying loads or system disturbances, which base load plants with steam systems powered by combustion or nuclear processes cannot accommodate.

Hydroelectric power generation in which kinetic energy is extracted from flowing pressurized water and used to rotate a generator to produce electric power is known. In addition, the use of other pressurized fluids such as gas, steam, etc., to rotate a generator is known. Using a large hydroelectric power generation system operating with a large-scale water source such as a river or dam can generate thousands of megawatts of power. As such, the conversion of the kinetic energy in the flowing water to electric power may include significant inefficiencies and yet still provide an economical and acceptable level of performance.

As the size of the hydroelectric power generation equipment becomes smaller, the magnitude of electric power produced also becomes smaller. In addition, the amount of flowing water from which kinetic energy may be extracted becomes less. Thus, the efficiency of the conversion of the kinetic energy in the flow of water to electric power becomes significant. When there are too many inefficiencies, only small amounts of kinetic energy are extracted from the pressurized flowing water. As a result, the amount of electric power produced diminishes as the size of the hydroelectric power generation equipment becomes smaller.

DESCRIPTION OF THE RELATED ART

An international patent filing number WO2004033898A1 of 2003 discloses a miniature hydro-power generation system that produces electric power from a flow of liquid. The miniature hydro-power generation system may include a housing that includes a plurality of paddles positioned to extend outwardly from an outer surface of the housing. The system may also include a nozzle and a centering rod extending through the housing. The housing may rotate around the centering rod when a stream of liquid from the nozzle is directed at the paddles. A generator that includes a rotor and a stator may be positioned within a cavity of the housing. The rotor may be coupled with the housing and the stator may be coupled with the centering rod. The rotor may rotate around the stator at high RPM to generate electric power when the housing rotates. The electric power may supply a load and/or may be stored in an energy storage device.

The South Korean patent number KR100728421B1 describes a hydro-power generation for a water treatment system. Embodiments of a hydropower system include a rotatable impeller located in a housing. The impeller is rotatably coupled to the generator. As water passes through the water treatment system, the water flows into the hydropower system and causes the impeller to rotate. The impeller rotates to generate electricity in the water treatment system by the generator. Another embodiment of the hydropower system includes a rotor rotatably positioned in a conduit through which water flows. Flowing water rotates the rotor. The rotor interacts with the surrounding stator. As the rotor rotates within the stator, electricity is generated for the water treatment system.

The U.S. Pat. No. 4,443,707A of 1082 teaches of a hydroelectric generating system to produce power by changing the potential energy of water to kinetic energy to drive a turbine that is coaxially connected to a generator. Water from the ambient enters the reservoir and is directed by a valve to a conduit to the turbine which turns a generator to produce electricity. The system is constructed in such a manner that it may supply power during peak power demand and be used as a storage system during low power demand.

OBJECT OF THE INVENTION

The main object of the present invention is to provide an alternative source of electric energy generation in open water using a hydroelectric power generation system.

BRIEF SUMMARY OF THE INVENTION

In one embodiment of the present invention, the disclosed hydroelectric power generation system comprises a retaining reservoir, an intake reservoir, a drive housing, a drive comprising an internal hydraulic turbine and an internal hydroelectric generator, an exit channel having an induction coil, a support structure, an external hydraulic turbine, and an external hydroelectric generator. The internal hydraulic turbine is configured to convert the energy of flowing water into mechanical energy. The internal hydroelectric generator is mechanically coupled to the internal hydraulic turbine and configured to convert the mechanical energy of the internal hydraulic turbine into electricity. Particularly, when the rotor of the internal hydroelectric generator turns, it causes the electromagnets to move past the conductors mounted in the stator, in turn causing electricity to flow and a voltage to develop at the generator's output terminals. The induction coil is located within an area separating an inner wall and an outer wall of the exit channel. The external hydroelectric generator is mechanically coupled to the external hydraulic turbine and electronically coupled to the induction coil. The external hydroelectric generator is configured to convert the mechanical energy of the external hydraulic turbine into electricity. The induction coil is configured to receive an electric current from the external hydroelectric generator and heat up.

In another embodiment of the present invention, a hydroelectric power generation system induction heating comprises a retaining reservoir, an intake reservoir, a drive housing, a drive comprising an internal hydraulic turbine and an internal hydroelectric generator, more than one exit channels each having an induction coil, a support structure, more than one external hydraulic turbines, and more than one external hydroelectric generators.

The disclosed invention may be embodied in the form illustrated in the accompanying drawings, with an understanding that the drawings are provided for illustrative purposes and that changes to the specific construction illustrated and described within the scope can be made without departing from the scope and spirit of the disclosed invention. Furthermore, the hydroelectric power generator according to the present invention is not limited thereto, and it will be apparent that various deformations and modifications are available by a person having ordinary skill in the art within the scope without departing from the technical idea of the present invention.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another.

The present invention has been designed to function as a hydroelectric power generation system. It utilizes the principles of displacement, fluid dynamics, and electromagnetic induction heating to generate electric power when used in an open-water environment. Accordingly, the present invention is configured to generate power without the need for topography necessary for traditional land-based hydroelectric power generation systems to operate.

Figure 1:
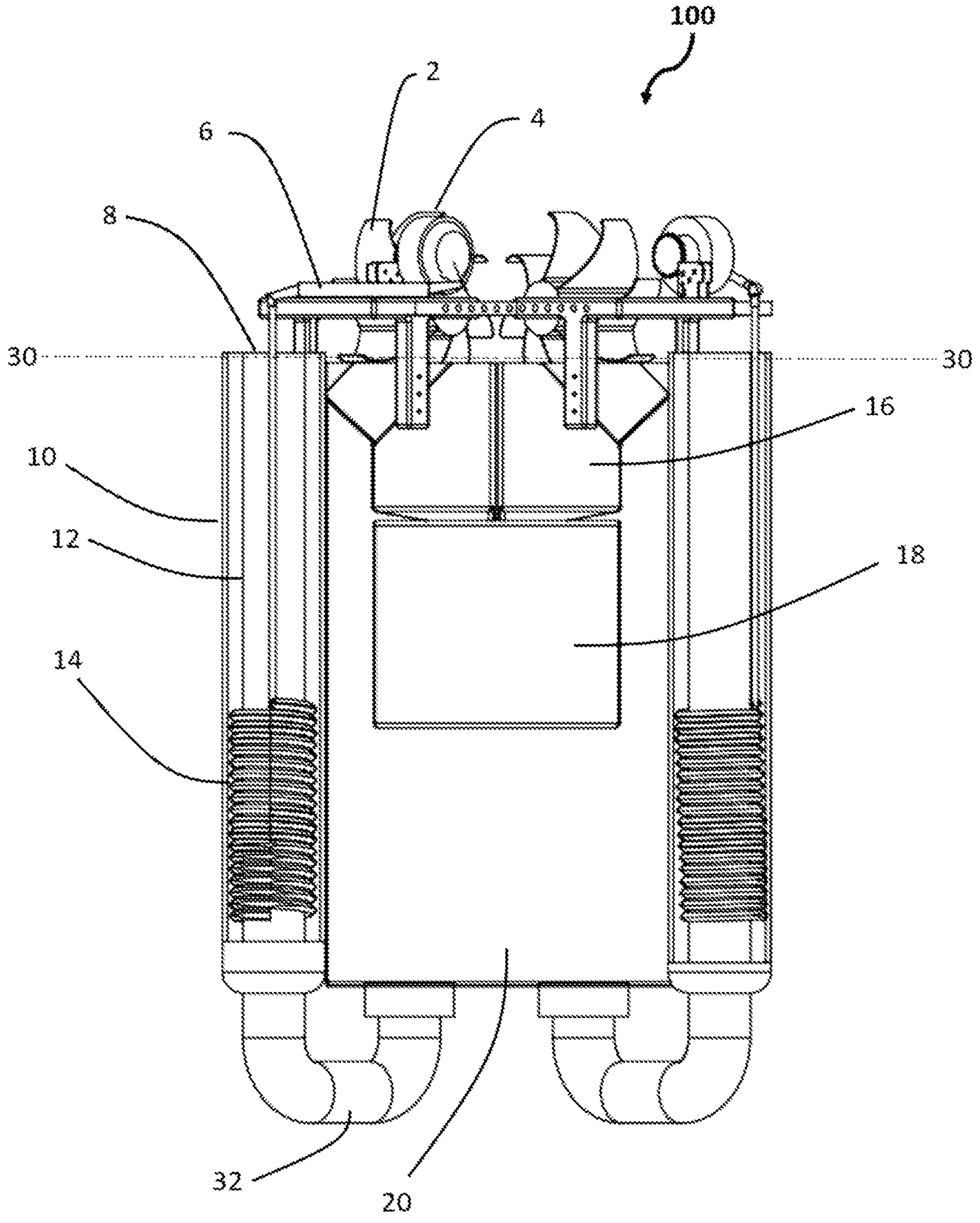
FIG. 1 is a front elevation view showing a configuration of a hydroelectric power generation system according to one embodiment of the present invention with portions of the exit channel and the retaining reservoir removed to show the internal components of the system.

As seen in reference to FIG. 1, a configuration of a hydroelectric power generation system 100 according to one embodiment of the present invention with portions of the exit channel and retaining reservoir removed to highlight the internal components of the system is shown. The system 100 includes a retaining reservoir 20, an intake reservoir 16, a drive housing 18, a drive comprising an internal hydraulic turbine and an internal hydroelectric generator (not shown), one or more exit channels 8 each having an induction coil 14, a support structure 16, an external hydraulic turbine 2, and an external hydroelectric generator 4. The retaining reservoir 20 has an open top surface and a closed bottom surface with one or more output holes. The intake reservoir 16 has a top surface with one or more intake holes and a bottom surface with one or more output holes. The intake reservoir 16 is connectively coupled to the top-inside section of the retaining reservoir 20. The drive housing 18 has a top surface with one or more intake holes and a bottom surface with one or more output holes. The top surface of the drive housing 18 is coupled to the bottom surface of the intake reservoir. The drive is located within the drive housing 18 and comprises an internal hydraulic turbine configured to convert the energy of water flowing through the drive housing 18 into mechanical energy and an internal hydroelectric generator mechanically coupled to the internal hydraulic turbine and configured to convert the mechanical energy of the internal hydraulic turbine into electricity. Particularly, when the rotor of the internal hydroelectric generator turns, it causes the electromagnets to move past the conductors mounted in the stator, in turn causing electricity to flow and a voltage to develop at the generator's output terminals. The exit channels 8 each comprise an inner wall 12, an outer wall 10, an open top surface, a closed bottom surface having an entry hole, and an induction coil 14 located within the area separating the inner wall 12 and the outer wall 10. The entry hole of each exit channel is coupled to the output hole of the retaining reservoir and configured to receive water from the retaining reservoir. The support structure 16 holds and supports the external hydraulic turbine 2 and the external hydroelectric generator 4. The external hydroelectric generator 4 is mechanically coupled to the external hydraulic turbine 2 and electronically coupled to the induction coil 14. The induction coil 14 is configured to receive current from the external hydroelectric generator 4 and heat up due to the received current.

Figure 2:
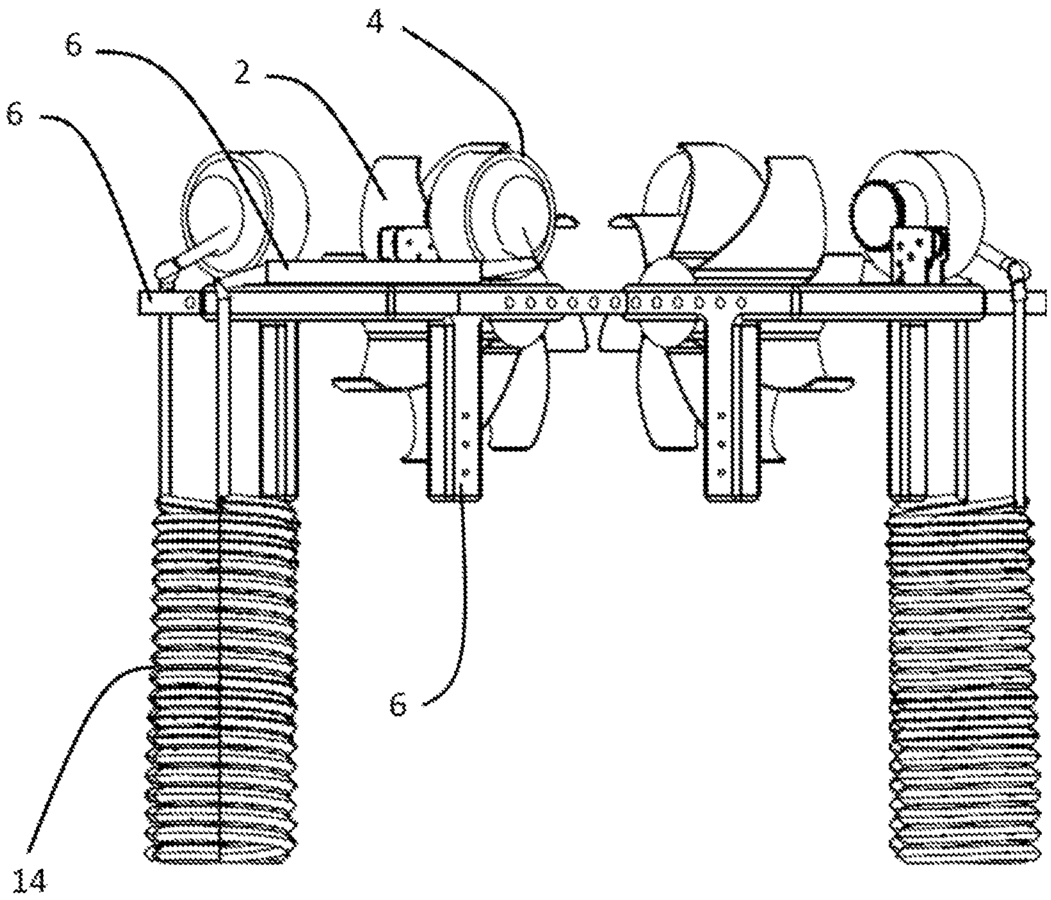
FIG. 2 is a front elevation view of the top portion of the system of FIG. 1.

As seen in reference to FIG. 2, a front elevation view of the top portion of the system of FIG. 1 is shown. In this preferred embodiment, the support structure 6 is configured to be removably attachable to the top portion of the retaining reservoir. The support structure 6 functions to support the one or more external hydraulic turbines 2 and their corresponding external hydroelectric generators 4. Each external hydroelectric generator 4 is electronically coupled to its corresponding induction coil 14 with a wire or the like.

In some embodiments, the support structure 6 may comprise a singular structure that supports each and every external hydraulic turbine 2 and its corresponding external hydroelectric generator.

In some embodiments, the support structure 6 may comprise a plurality of interconnected individual support structures, wherein each individual support structure supports its corresponding external hydraulic turbine 2 and its corresponding external hydroelectric generator 4.

In some embodiments, the support structure 6 is an extension of the retaining reservoir 20 such that the two components are constructed from a singular material.

Figure 3:
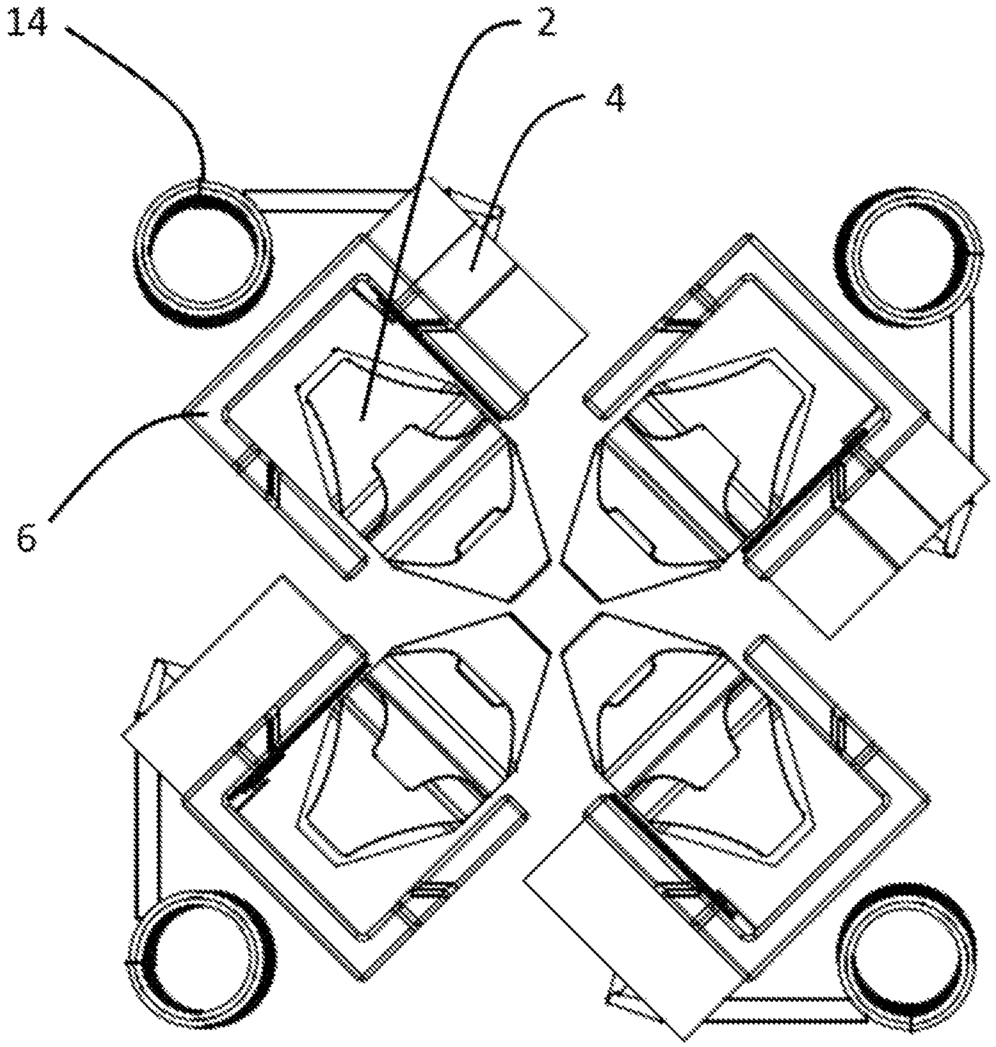
FIG. 3 is a top plan view of the top portion of the system of FIG. 1.

As seen in reference to FIG. 3, a top plan view of the top portion of the system of FIG. 1 is shown according to one embodiment of the present invention. In this preferred embodiment, the orientation of external hydraulic turbines 2 facilitates the turning of the turbines as water enters the system.

Figure 4:
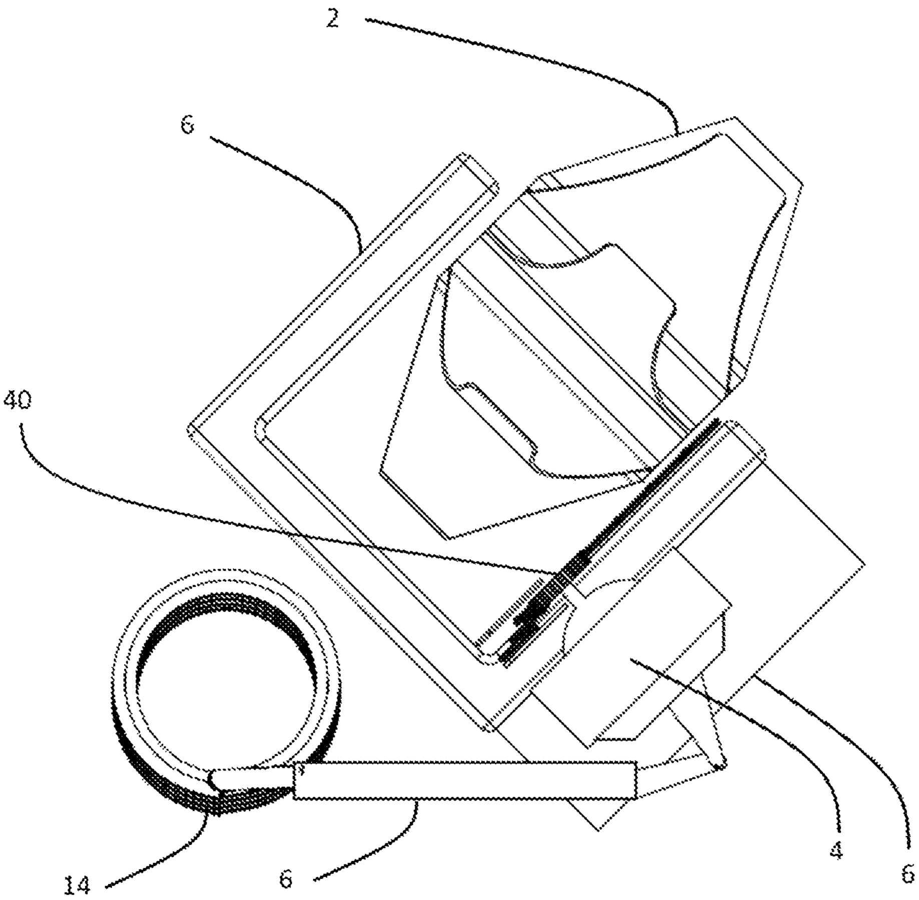
FIG. 4 is a top plan view of an individual set of an external hydraulic turbine, an external hydroelectric generator, and an induction coil of FIG. 3.

As seen in reference to FIG. 4, a top plan view of an individual set of an external hydraulic turbine 2, an external hydroelectric generator 4, and an induction coil of FIG. 3 according to one embodiment of the present invention is shown. The external hydraulic turbine 2 is mechanically coupled to the external hydroelectric generator 4 using a gear system 40. The support system 6 also serves to protect and support the wiring that connects the induction coil 14 with the external hydroelectric generator 4.

Figure 5:
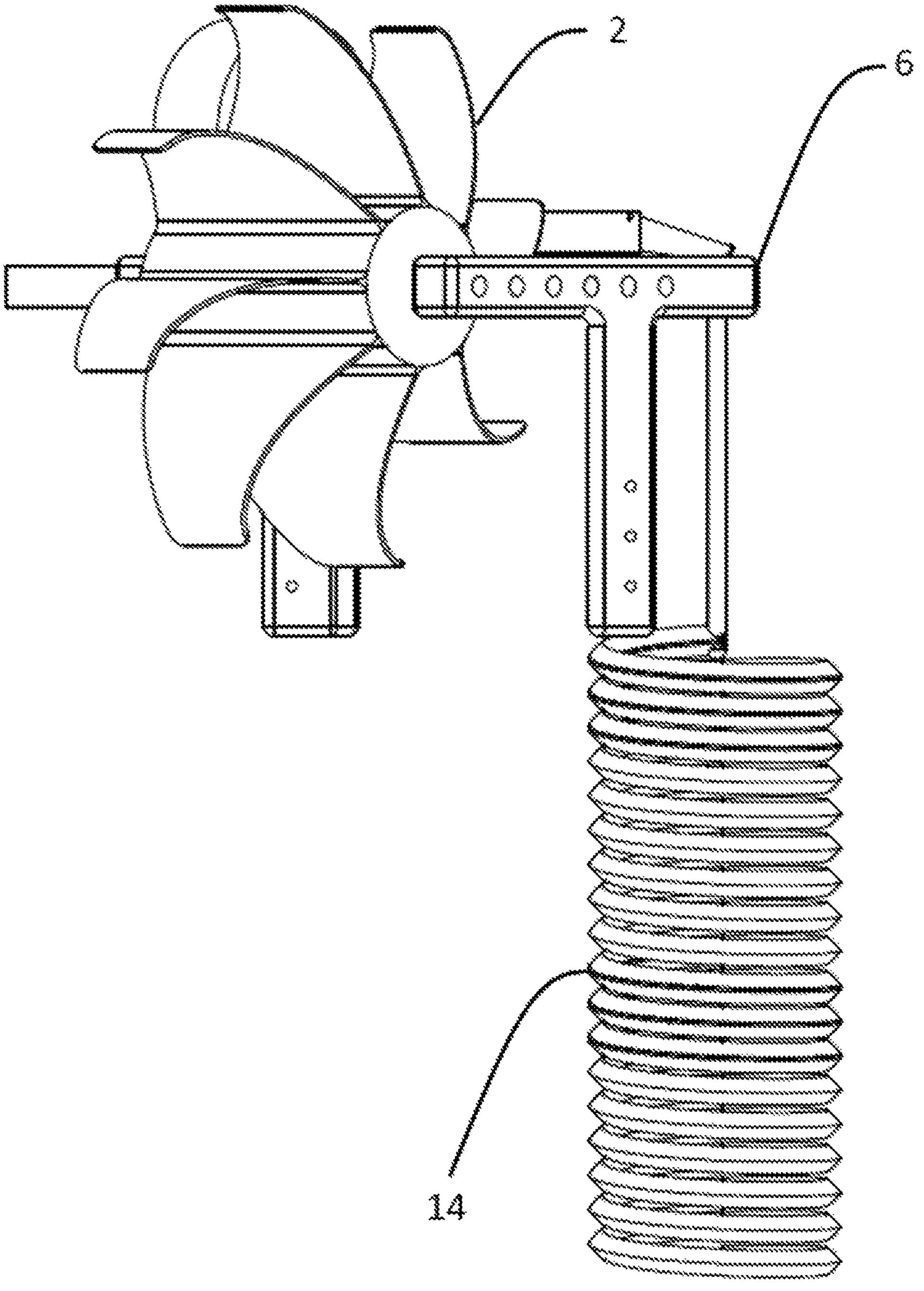
FIG. 5 is a side view of various components of the unit of FIG. 4.

As seen in reference to FIG. 5, a side view of various components of the unit of FIG. 4 is shown.

Figure 6:
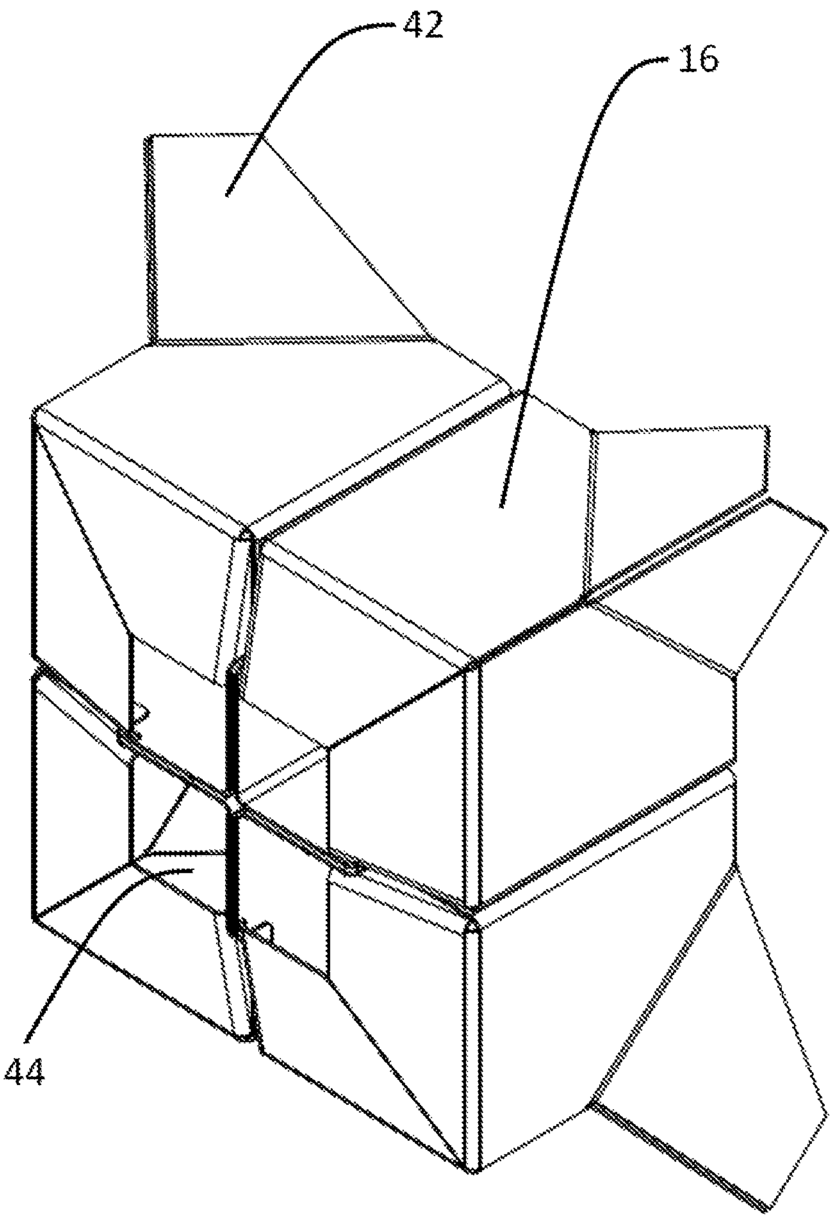
FIG. 6 is a perspective view showing an intake reservoir according to one embodiment of the present invention.

As seen in reference to FIG. 6, a perspective view showing an intake reservoir 16 according to one embodiment of the present invention is shown. The intake reservoir 16 comprises one or more intake holes 42 and one or more output holes 44. The intake reservoir 16 has a generally open top surface and a closed bottom surface with the one or more output holes 44. In this preferred embodiment, the orientation of and location of the one or more output holes 44 facilitates the flow of water from the intake reservoir 16 to the drive housing.

In some embodiments, the intake reservoir may have a funnel shape.

In some embodiments, the intake reservoir 16 and the driver housing are constructed of a singular material and are not detachable.

Figure 7:
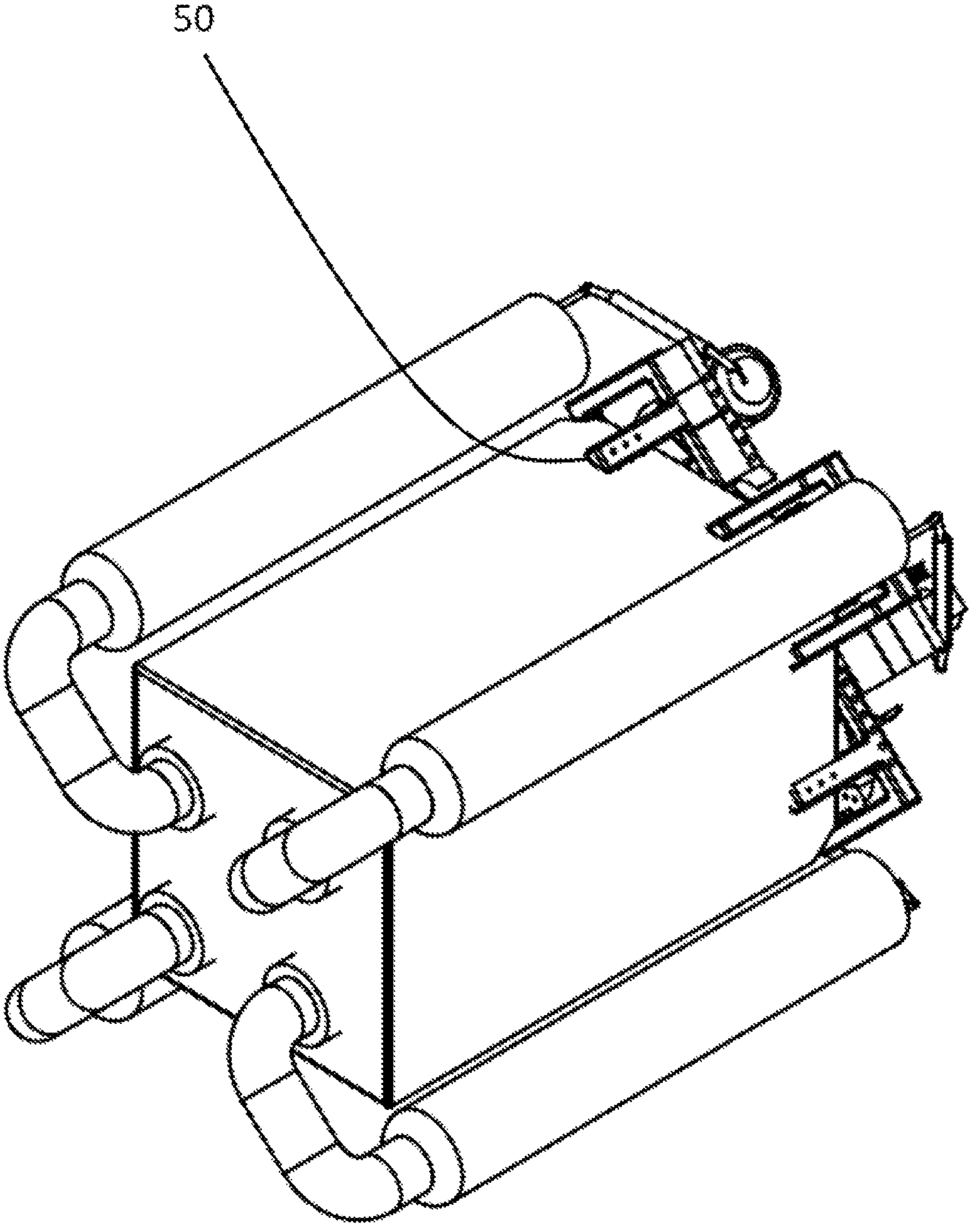
FIG. 7 is a perspective view of the system of FIG. 1.

As seen in reference to FIG. 7, a perspective view of the system of FIG. 1 is shown, highlighting an attachment point 50 between the support system and the retaining reservoir.

In the preferred operation of the present invention, the hydroelectric power generation system 100 would be made neutrally buoyant prior to operation by utilizing requisite rigging infrastructure such that, referring to FIG. 1, the top of the exit channels 8 are above water line 30 and the open top surface of the retaining reservoir 20 is below the water line 30. In practice, the proper weight is added to the system 100 necessary to make it neutrally buoyant, such that the system 100 is at the appropriate depth relative to the water line 30. Next, rigging is added to the device to further secure the system 100 relative to the water line 30 and to prevent lateral movement of the system 100 during operation.

When the system 100 is initially oriented in a body of water, the water displaced by the air within the retaining reservoir 20 and the one or more exit channels causes intake water to enter the system through the one or more intake holes of the top surface of the intake reservoir 16. The intake reservoir is configured to direct intake water from the body of water surrounding the system to the drive located in the drive housing 18 via its internal passageways connecting its one or more intake holes and their corresponding one or more output holes.

Intake water flowing into the system 100 moves the external hydraulic turbine 2 of the drive, converting the energy of the flowing intake water into mechanical energy wherein the gravitational force applied to the external hydraulic turbine 2 by the intake water exceeds the threshold of resistance imposed by the external hydraulic turbine 2. This mechanical energy is converted to electricity by the mechanically coupled external hydroelectric generator 4. The induction coils 14 of the one or more exist exit channels 8 receive this electric current and heat up as a result. As the induction coils 14 heat up, their heat transfers to their corresponding inner wall 12 of their corresponding exit channel 12. Once in the drive housing 18, the intake water interacts with the drive. Here, the intake water moves the internal hydraulic turbine of the drive, converting the energy of the flowing intake water into mechanical energy wherein the gravitational force applied to the internal hydraulic turbine by the intake water exceeds the threshold of resistance imposed by the internal hydraulic turbine 2. This mechanical energy is converted to electricity by the mechanically coupled internal hydroelectric generator.

After moving through the drive, the intake water escapes into the retaining reservoir 20 through the output hole on the bottom surface of the drive housing 18. The intake water first fills up the means of hydraulic connection 32 between the one or more output holes of the retaining reservoir 20 and their corresponding entry holes of the bottom surfaces of the exit channels 8. The water then proceeds to gradually fill up the retaining reservoir 20 and one or more exit channels 8 with e an approximately uniform level of water.

Intake water in the one or more exit channels 8 is heated by the inner walls 12 of the exit channels 8. This added heat facilitates the natural evaporation of water in the one or more exit channels 8 from the system 100 via the open top surface of the one or more exit channels 8. This evaporation of intake water from the one or more exit channels 8 drives further intake of water into system 100. Particularly, this evaporation causes the water level in the retaining reservoir 20 and the one or more exit channels 8 to drop, allowing for new intake water to enter the system 100.

If the system 100 is completely saturated with intake water, new intake water will enter the system 100 only in response to the natural and gradual evaporation of water within the one or more exit channels 8.

In some embodiments, the electricity generated by the drive is stored in a chargeable internal battery housed within the system 100. In other embodiments, the electricity generated by the drive is stored in a chargeable external battery removed from the system 100, wherein the generated electricity is transferred to the external battery via wires or the like. In yet other embodiments, the electricity generated by the drive is added directly to an existing power grid or the like for immediate use.

In some embodiments, the surface area of the open top surface of the one or more exit channels 6 is significantly greater than the surface area of the one or more intake holes of the top surface of the intake reservoir 16. This ratio of surfaces area will facilitate a significantly greater escape of intake water from the system 100 from the exit channels 6 than that of the intake reservoir 16.

The terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Also, in the following claims, the terms "including" and "comprising" are open-ended, that is, a system, device, article, or process that includes elements in addition to those listed after such a term in a claim are still deemed to fall within the scope of that claim.

The present invention is not limited to the embodiments described above. Various changes and modifications can, of course, be made, without departing from the scope and spirit of the present invention. Additional advantages and modifications will readily occur to those skilled in the art. Accordingly, various modifications may be made without departing from the spirit or scope of the general inventive concept as defined by the appended claims and their equivalents.

It will also be appreciated that such development effort might be complex and time consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

The invention claimed is:

1. A hydroelectric power generation system for generating electricity in a body of water comprising:

a retaining reservoir having an open top surface and a closed bottom surface with one or more output holes;

an intake reservoir having a top surface with one or more intake holes and a bottom surface with one or more output holes, wherein the intake reservoir is connectively coupled to the top-inside section of the retaining reservoir;

a drive housing having a top surface with an intake hole and a bottom surface with an output hole, wherein the top surface of the drive housing is coupled to the bottom surface of the intake reservoir;

a drive located within the drive housing comprising:

one or more internal hydraulic turbines configured to convert the energy of flowing water into mechanical energy; and, one or more internal hydroelectric generators mechanically coupled to their corresponding internal hydraulic turbines and configured to convert the mechanical energy of the internal hydraulic turbines into electricity;

one or more exit channels each having an inner wall, an outer wall, an open top surface, a closed bottom surface having an entry hole, and an induction coil;

wherein the one or more induction coils are located within the area separating the inner wall and the outer wall of their corresponding exit channel; and, wherein the entry holes of the exit channels are coupled to their corresponding output holes of the retaining reservoir;

a support structure connected to the top portion of the retaining reservoir;

one or more external hydraulic turbines mounted on the support structure; and, one or more external hydroelectric generators mechanically coupled to their corresponding external hydraulic turbines and electronically coupled to their corresponding induction coils, mounted on the support structure;

wherein the one or more induction coils are configured to receive an electric current from their corresponding external hydroelectric generators and heat up.

2. The hydroelectric power generation system of claim 1, the support structure comprising a singular structure configured to support the one or more external hydraulic turbines and their one or more corresponding external hydroelectric generators.

3. The hydroelectric power generation system of claim 1, the support structure comprising a plurality of removably attachable individual support structures wherein each individual support structure supports its corresponding external hydraulic turbine and its corresponding external hydroelectric generator.

4. The hydroelectric power generation system of claim 1, wherein the support structure is an extension of the retaining reservoir such that the two components are constructed from a singular material.

5. The hydroelectric power generation system of claim 1, wherein the combined surface area of the open top surface of the one or more exit channels is greater than the combined surface area of the one or more intake holes of the top surface of the intake reservoir.

6. The hydroelectric power generation system of claim 1, wherein the combined surface area of the open top surface of the one or more exit channels is at least two times greater than the combined surface area of the one or more intake holes of the top surface of the intake reservoir.

7. The hydroelectric power generation system of claim 1, wherein there are four external hydraulic turbines, four external hydroelectric generators, and four exit channels.

8. The hydroelectric power generation system of claim 1, wherein the one or more induction coils extend from the bottom portion of their respective exit channel to vertical level corresponding to the bottom of the drive housing.

9. The hydroelectric power generation system of claim 1, wherein the energy generated by the one or more internal hydroelectric generators is stored in a chargeable internal battery housed within the system, stored in a chargeable external battery removed from the system wherein the generated electricity is transferred to the external battery via wires or added directly to an existing power grid for immediate use.

10. A hydroelectric power generation system for generating electricity in a body of water comprising:

a retaining reservoir;

an intake reservoir connectively coupled to the top-inside section of the retaining reservoir;

a drive housing coupled to the bottom surface of the intake reservoir;

a drive located within the drive housing comprising:

one or more internal hydraulic turbines configured to convert the energy of flowing water into mechanical energy; and, one or more internal hydroelectric generators mechanically coupled to their corresponding internal hydraulic turbines and configured to convert the mechanical energy of their corresponding internal hydraulic turbines into electricity;

one or more exit channels each having an inner wall, an outer wall, an open top surface, a closed bottom surface having an entry hole, and an induction coil;

wherein the one or more induction coil is located within the area separating the inner wall and the outer wall of its corresponding exit channel; and, wherein the entry holes of the exit channels are coupled to their corresponding output holes of the retaining reservoir;

a support structure connected to the top portion of the retaining reservoir;

one or more external hydraulic turbines mounted on the support structure; and, one or more external hydroelectric generators mechanically coupled to their corresponding external hydraulic turbines and electronically coupled to their corresponding induction coils, mounted on the support structure;

wherein the one or more induction coils are configured to receive an electric current from their corresponding external hydroelectric generators and heat up.

11. The hydroelectric power generation system of claim 10, the support structure comprising a singular structure configured to support the one or more external hydraulic turbines and their one or more corresponding external hydroelectric generators.

12. The hydroelectric power generation system of claim 10, the support structure comprising a plurality of removably attachable individual support structures wherein each individual support structure supports its corresponding external hydraulic turbine and its corresponding external hydroelectric generator.

13. The hydroelectric power generation system of claim 10, wherein the support structure is an extension of the retaining reservoir such that the two components are constructed from a singular material.

14. The hydroelectric power generation system of claim 10, wherein the combined surface area of the open top surface of the one or more exit channels is greater than the combined surface area of the one or more intake holes of the top surface of the intake reservoir.

15. The hydroelectric power generation system of claim 10, wherein the combined surface area of the open top surface of the one or more exit channels is at least two times greater than the combined surface area of the one or more intake holes of the top surface of the intake reservoir.

16. The hydroelectric power generation system of claim 10, wherein there are four external hydraulic turbines, four external hydroelectric generators, and four exit channels.

17. The hydroelectric power generation system of claim 10, wherein the one or more induction coils extend from the bottom portion of their respective exit channel to vertical level corresponding to the bottom of the drive housing.

18. The hydroelectric power generation system of claim 10, wherein the energy generated by the one or more internal hydroelectric generators is stored in a chargeable internal battery housed within the system, stored in a chargeable external battery removed from the system wherein the generated electricity is transferred to the external battery via wires or added directly to an existing power grid for immediate use.

* * * * *